Figure 1:
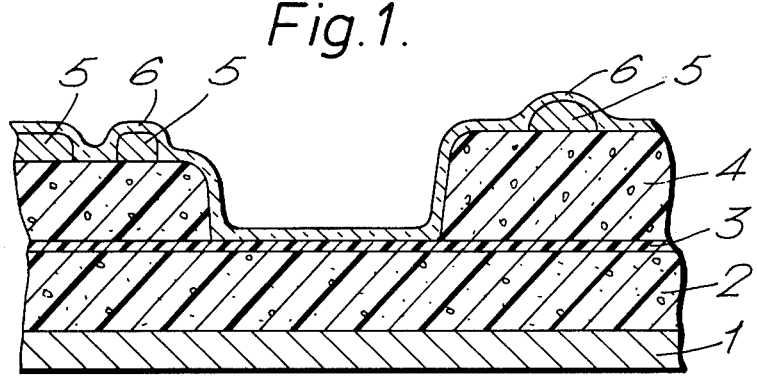

United States Patent [19]

Mawson et al.

[11] 4,172,169
[45] Oct. 23, 1979

[54] FLOOR OR WALL COVERINGS

[75] Inventors: Alan Mawson, Leslie; Frederick J. Rigby, Kirkcaldy; Brian Williams, Coaltown of Wemyss, all of Scotland

[73] Assignee: Nairn Floors Limited, Lune Mills, United Kingdom

[21] Appl. No.: 835,943

[22] Filed: Sep. 22, 1977

[30] Foreign Application Priority Data

Oct. 1, 1976 [GB] United Kingdom ............... 40927/76
Oct. 1, 1976 [GB] United Kingdom ............... 40930/76
Oct. 1, 1976 [GB] United Kingdom ............... 40932/76

[51] Int. Cl.² ............................................. B32B 3/30
[52] U.S. Cl. .................................... 428/159; 427/262; 428/161; 428/165; 428/172; 428/203; 428/315; 428/320; 428/335
[58] Field of Search ............... 428/158, 159, 160, 172, 428/334, 335, 320, 321, 314, 315, 161, 165, 203; 427/262, 264, 265, 267, 270, 274, 275, 276, 280, 373, 288; 156/78, 79, 221; 264/DIG. 82, 54, 55, 52

[56] References Cited

U.S. PATENT DOCUMENTS

| | | | |
|---|---|---|---|
| 2,920,977 | 1/1960 | Adams | 428/170 |
| 3,293,094 | 12/1966 | Nairn et al. | 428/158 |
| 3,870,591 | 3/1975 | Witman | 428/159 |
| 3,905,849 | 9/1975 | Bomboire | 428/159 |
| 3,914,485 | 10/1975 | Curtis | 428/159 |
| 3,931,429 | 1/1976 | Austin | 427/373 |
| 3,978,258 | 8/1976 | Faust et al. | 428/159 |
| 4,017,658 | 4/1977 | Bomboire | 428/159 |

*Primary Examiner*—Stanley S. Silverman
*Attorney, Agent, or Firm*—Lawrence Rosen; E. Janet Berry

[57] ABSTRACT

A floor or wall covering is disclosed which comprises a foamed polymeric layer including raised areas separated by recessed areas and a protective layer over the upper surface of the covering and comprising a first non-foamed layer and a second non-foamed layer and in which the second non-foamed layer is discontinuous and leaves part at least of the first non-foamed layer uncovered and has a gloss different from that of the first non-foamed layer or at least one of the first and second non-foamed layers is discontinuous and provides the protective layer with a difference in thickness that imparts a pattern in relief to the said covering.

11 Claims, 3 Drawing Figures

FLOOR OR WALL COVERINGS

Decorative plastic wall or floor coverings are well known and are made on a very large scale. Some have substantially uniform surface level, the decoration generally being formed by a multi-colour design printed onto or into the material. Some such materials include a layer of foamed vinyl material covered by a wear resistant layer.

Numerous attempts have been made to provide decorative such floor coverings having a profiled surface. Various methods have been proposed. For instance in French Patent Specification No. 2,251,446 a system is described in which a decorative effect is printed onto a sheet of solid plastics material, a transparent wear resistant layer is applied over this and a profiled effect is achieved by printing further plastics material over this in selected areas only. However despite these and other proposals the way of achieving a profiled effect that has been used widely commercially is to form the covering of a foamed polymeric layer that includes raised areas separated by recessed areas and to provide a protective layer over the foamed layer so as to give the desired self-cleaning and wear resistant properties to the product.

There are two general ways of making such profiled cushioned floor or wall coverings. In one a substantially uniform layer of foamable material is deposited on a substrate and is then foamed, generally after application of the wear resistant layer, and is them mechanically embossed so as to give the desired profiled effect. Such a process is described in U.S. Pat. No. 3,741,851. However this method does suffer from the disadvantage that it requires sophisticated embossing machinery and embossing patterns have to be stored for every profile design that it is desired to make. Accordingly this system is best used only when a limited number of fairly simple designs are to be produced. Also it is made clear in U.S. Pat. No. 3,741,851 that the embossing can do physical damage to the wear resistant layer and this itself is generally undesirable.

The second method of making cushioned floor or wall coverings having a profiled surface has been adopted more widely commercially and comprises depositing on a substrate a layer of foamable material capable of being foamed to a surface level in first areas above the level in the remainder of the surface areas and causing such foaming, usually after applying the wear resistant layer.

The foamable layer may be an overall layer of foamable material or may be a discontinuous layer, with foamable material being deposited in some parts only of the surface layer so that on foaming there are raised first areas of foamed material separated by areas where there is no foamed material.

In general there are two main ways of depositing a layer of foamable material capable of being foamed to a surface level in first areas above the level in the remainder of the surface. In one of these methods foamable composition is applied onto the substrate so that different areas of the substrate carry different amounts of the same composition (e.g. by spreading on a profiled substrate or by printing) or the same or different amounts of different compositions, e.g. compositions containing different amounts of blowing agent. Such methods are described in, for example, U.S. Pat. Nos. 2,920,977 and 3,239,365 and British Patent Specifications Nos. 968,991 and 1,409,295. In the other main way of carrying out this method a substantially uniform layer of foamable composition is deposited and chemical agent is provided in selected areas only, for example by printing underneath it, over it or over a wear resistant layer over it, that will cause preferential foaming in different areas. Thus an inhibitor for the blowing agent may be applied in certain areas so as to cause less foaming in those areas than in others. Such methods are described in for example British Patent Specifications Nos. 1,069,998 and 1,150,902.

There has been very large scale production of profiled cushioned wall or floor coverings and this has been accompanied by the production of designs of ever increasing detail and complexity. For instance it is now common to effect, for example, six different printing operations over the foamable layer before applying the transparent wear layer, and sometimes to rely also upon design characteristics in the foamable layer itself. This increasing complexity of design creates considerable difficulties and expense in conducting the actual printing and so there is an urgent need in practice to devise some new and simple way of improving the decorative appeal of profiled cushioned wall or floor coverings.

It is well accepted that for good wear resistance and cleaning properties it is essential to provide a protective layer as the top surface of the floor or wall covering. In for instance British Patent Specification No. 968,991 and U.S. Pat. No. 3,239,365 it appears that a coloured material is printed onto a substantially smooth upper layer of a foamable composition but the processes described therein appear to be capable of giving only a very limited range of designs both of colour and profiled effect and do not appear to have been successful commercially. What has succeeded commercially are processes in which a single colour protective coating, generally a clear transparent coating, is applied over generally the entire surface of the covering but sometimes over the raised parts only of the covering. Thus this protective layer has not contributed to the decorative effect.

A floor or wall covering according to the invention comprises a foamed polymeric layer including raised areas separated by recessed areas and a protective layer over the upper surface of the covering and comprising a first non-foamed layer and a second non-foamed layer and in which the second non-foamed layer is discontinuous and leaves part at least of the first non-foamed layer uncovered and has a gloss different from the that of the first non-foamed layer or at lest one of the first and second non-foamed layers is discontinuous and provides the protective layer with a different in thickness that imparts a pattern in relief to the said covering.

Thus by the invention use is made for the first time of the wear layer which has been present in most at least of the vast volume of cushioned floor coverings that have been produced in recent years but which in practice previously has been a clear layer not imparting any decorative design effect to the product. Thus in the invention for the first time the wear layer is so designed either to increase the profiled effect due to the profiled foamed layer or to give a pattern of differences in gloss, or preferably both.

Preferably the second layer is discontinuous and covers parts only of the first layer. This is a particularly convenient way of depositing the protective layer and has the advantage that it is applicable both to obtaining differences in profile due to the second layer and to obtaining differences in gloss due to the second layer. However as explained in more detail below when a profiled effect only is desired, without differences in gloss, the first layer may be discontinuous and the second layer may completely overlie the first layer, so that the differences in profile arise at least in part from the deposits of the first layer.

Although differences in gloss are mentioned as being obtainable by the embossing process described in U.S. Pat. No. 3,741,851 they are only obtainable as a result of damaging the protective layer and are limited to being in register with the entire embossed areas, whereas by the invention the pattern of differences in gloss is obtained simply by printing the second layer wherever the desired pattern is required. Thus this method permits much greater variations in design and in particular in the production of a fine design, and results in the wear layer being undamaged. The process of French Patent Specification No. 2,251,446 is also incapable of giving such wide variations in design, especially in the profile, as are readily obtainable in the products of the invention. Thus in French Patent Specification No. 2,251,446 it is generally not convenient to obtain more than two surface levels and the differences in level are generally rather small unless large amounts of solid plastics material are printed. In the products of the invention, however, several different surface levels can readily be achieved and in particular varying profiling effects can be obtained. Thus for example major profiling effects, for instance 0.1 to 0.3 mm in depth, can readily be obtained by appropriate profiling of the foamed layer and then finer profiling effects, for instance 0.05 to 0.1 mm in depth, can be superimposed on these major effects by appropriate printing of discontinuous non-foamed layer. Accordingly the invention utilises materials that have traditionally been present in the vast volume of cushioned vinyl floor coverings that have been produced commercially to obtain in a simple manner a greatly increased variation in design effects.

According to one preferred aspect of the invention the second non-foamed layer is discontinuous and provides the protective layer with a pattern of differences in gloss.

In this aspect of the invention the protective layer may be made up solely of the specified first and second layers or it may include one or more further layers, provided always that such further layers do not obscure entirely the differential gloss effect. Thus, in general, if these further layers are continuous they will be beneath the first layer but if they are discontinuous they may be over some of the parts of the first layer not covered by the second layer or they may be over some of the second layer, or both. Any such further layer may be formulated of polymeric material that is the same as, or different from, the first and/or second polymeric materials, e.g. it may serve to give a profiled effect or to give a different colour or opacity (as described in copending U.S. application Ser. No. 835941 filed even date herewith now abandoned) or to give a different gloss, or any combination thereof.

The protective layer generally covers the entire surface of the sheet material but if the profiled pattern includes some relatively small recessed areas it may not be necessary for it to cover these entirely. The protective layer will be a wear resistant layer at least in the raised areas of sheet material and generally over the recessed areas as well. Thus it will have sufficient strength to give good abrasion and tear resistance, generally comprising polyvinyl chloride or other vinyl polymer and being at least 0.05 mm thick, e.g. 0.05 to 0.7 mm. However parts of the protective layer, especially in recessed areas, may serve primarily to give good cleaning properties and so may be, say, 0.01 to 0.04 mm thick and may be of, for instance, polyurethane. The first and second, and any other, layers in the protective layer will be formulated of vinyl polymer, usually p.v.c., or polyurethane or other suitable polymer and to a thickness such that the resultant protective layer has the required thickness and other properties throughout its area. Any polyurethane used is preferably curable by ultraviolet radiation such that the coated product can be cured rapidly by radiation.

Usually the first layer is an overall layer but if desired both the first and second layers can be discontinuous, in which event they may be in abutting relationship or may overlap or the second layer may be wholly over first layer material.

It is normally preferred that the areas having differential gloss should be exactly in register with the areas of different surface level. Thus in the preferred embodiment first layer material is exposed only in raised areas of the foamable layer whilst second layer material is exposed only in recessed areas or vice versa. This effect can be achieved by applying the first and second layers in register with the foamable design. In an alternative embodiment, the first layers may be over parts at least of the raised areas only, and the second layers may be over parts only of the unraised areas, or vice versa.

In order to achieve the necessary difference in gloss the first and second layers may be formed from chemically different polymers or from different grades of the same or similar polymers and/or suitable additives which will improve or reduce gloss may be included in either or both layers. Examples of suitable additives are delustrants such as fine particle size silica or titanium dioxide, preferably having a particle size of the same order as the thickness of the layer. Usually such additives will be added in amounts of 1% to 20%, preferably 3 to 10%, by weight of the weight of the composition used for the layer. Suitable delustrants and their use are described in British Patent Specification No. 1,413,158.

It is often preferred that the, or the upper, non-foamed layer that extends over the raised areas at least should be at least 0.05 mm thick. Preferably both non-foamed layers are this thick but the second layer can be thinner, for instance being 0.01 to 0.04 mm thick especially when it is in the recessed areas or the first layer can be 0.01 to 0.04 mm thick and can extend either over the entire surface area or over the recessed areas only. Thus the, or the upper, non-foamed layer in the recessed areas may be 0.01 to 0.04 mm thick.

If it is desired that the differences in gloss should not be accompanied by differences in profile due to the second layer then either the first and second layers should not overlie one another or the areas of the second layer should be coextensive with raised or recessed areas of the foamed layer, so that the additional profiling due to the second layer is overlooked or the second layer should be sufficiently thin that if it overlies, at least in part, the first layer it does not contribute to the profiling effect. In this instance, the second layer will preferably be 0.01 to 0.04 mm thick. Preferably it is then in the recessed areas, but can also be on the raised areas.

In a second aspect of the invention at least one of the first and second non-foamed layers is discontinuous, is at least 0.05 mm thick and partly or completely overlies or underlies the other of the first and second non-foamed layers and is not coextensive with the raised or the recessed areas of the foamed layer. By ensuring that the layers are not coextensive these layers themselves impart a pattern in relief to the said covering. If, for instance, the second layer was coextensive with the recessed areas or with the raised areas then it would merely increase or decrease the depth of the profiled effect due to the foamed layer and would not in its own right impart a pattern in relief to the product. Similarly, in order that the layers do impart such a pattern they must not combine so as to destroy profiled effect that would be given by any one of them individually. For instance it is valueless to form the protective layer solely of the two discontinuous layers of equal thickness in abutting relationship.

A protective layer is thus provided that is of varying thickness such that the final product, after foaming, has a greater number of surface levels than if the protective layer had been a conventional wear layer that is either of uniform thickness or is of increased thickness in the recessed areas of foam, thus tending to reduce the number of surface levels.

The protective layer may be made up solely of the specified two layers or it may include one or more further layers, provided always that such further layers do not obscure entirely the profiled effect. Usually at least one of the layers of the protective layer is continuous, but all the layers can be discontinuous. Discontinuous layers may be in abutting relationship or may overlap or one may be wholly over another. It is generally preferred that the second layer should be discontinuous and should at least partly overlie the first layer, and preferably one of the first and second layers is discontinuous and is at least 0.05 mm thick and the other is continuous.

The protective layer may include more than one continuous layer and/or more than one discontinuous layer. The discontinuous layer or layers may be beneath any continuous layer or layers or may be between continuous layers, but are generally above any continuous layers. The various layers of the protective layer may be formulated of the same or different polymeric compositions, e.g one or more may serve to give a different colour or opacity (as described in copending U.S. application Ser. No. 835,941 filed even date herewith now abandoned) or to give a different gloss, or any combination thereof.

The protective layer generally covers the entire surface of the sheet material and is usually from 0.01 to 0.8 mm thick, but if the profiled foam pattern includes some relatively small recessed areas it may not be necessary for it to cover these entirely. The protective layer will be a wear resistant layer as least in the raised areas of sheet material and generally over the recessed areas as well. Thus it will have sufficient strength to give good abrasion and tear resistance, generally comprising polyvinyl chloride or other vinyl polymer and being at least 0.05 mm thick, e.g. 0.05 to 0.7 mm. However parts of the protective layer, especially in recessed areas, may serve primarily to give good cleaning properties and so may be, say, 0.01 to 0.04 mm thick and may be of, for instance, polyurethane. The layers in the protective layer will be formulated of vinyl polymer, usually p.v.c., or polyurethane or other suitable polymer and to a thickness such that the resultant protective layer has the required thickness and other properties throughout its area. Any polyurethane used is preferably curable by ultraviolet radiation such that the coated product can be cured rapidly by radiation.

The protective layer may include an outermost layer that is a thin, e.g. 0.01 to 0.04 mm, usually glossy, layer of polyurethane. This may be an overall layer, or may be a discontinuous layer, e.g. to give a differential gloss effect compared to the remainder to the exposed protective layer which may be of a vinyl resin having a matt surface.

All products of the invention, irrespective of whether the protective layer is imparting a gloss pattern or a profile pattern, may be made by depositing at least one layer of foamable material and the layers of the protective layer, the or any discontinuous layers being deposited by printing, and then foaming the foamable material and producing the profiled effect in the foam.

Although the production of this profiled effect can be achieved by embossing the product after foaming, e.g. as described in U.S. Pat. No. 3,741,851, it is usually preferable to achieve this profiled effect during foaming. Thus either the foamable layer may be formed of different amounts of the same composition or the same or different amounts of different compositions or the foamable layer may be a uniform layer that has included in it in selected areas only a chemical agent that will cause preferential foaming in different areas, all as described above. The foamable polymer is generally of p.v.c. or other vinyl polymer.

Generally a decorative pattern is incorporated in or over the foamed layer and part at least of this pattern is visible through the protective layer. Some or all of the layers of the protective layer may be transparent. Part at least of the pattern may be due to having printed differently coloured foamable plastisols to form the foamable layer, but preferably part at least, and usually all, the pattern is formed by printing non-foamable inks over the foamable layer and beneath the wear layer. These inks may be printed direct onto the foamable layer or over an overall non-foamable layer that is spread over the foamable layer to provide a smoother base and/or better colour for printing.

Continuous layers of the protective layer may be deposited by any convenient method, e.g. reverse roll or knife-on roll coating methods or by printing, while for discontinuous layers printing is used.

In one preferred process an overall foamable layer is applied, inks are applied by rotogravure or rotary screen printing, with the foamable layer and/or at least one of the ink compositions containing a foam-modifying ingredient, and at least a discontinuous layer, and usually all the layers, of the protective layer are then applied by rotary screen printing, and the product is then heated to foam and cure.

In another preferred process the foamable layer is formed by rotary screen printing of one or more foamable compositions, and the layers of the protective layer are also formed by rotary screen printing, and the product is then heated to foam and cure.

The foamable layer is formed on a substrate that may subsequently be removed but usually the substrate forms part of the final product.

Substrates known for use in cushioned floor and wall coverings may be used and may be formed of asbestos, glass fibre or cellulosic materials.

Although the foamed layer can be a continuous layer, so that there is foamed material over the entire substrate, particularly advantageous results are sometimes obtained if it is a discontinuous layer. In particular the foamed layer may be discontinuous and applied over a visible decorative layer and this decorative layer can then serve as part of the protective layer or may be visible through the protective layer. The substrate may consist of plastics material but generally it comprises fibrous material that may optionally have a coating of a solid or foamed plastics material. If the substrate includes a layer of solid plastics material then this layer may serve as the decorative plastics layer. Generally, however, the decorative plastics layer is deposited on a substrate which preferably, at the time of deposition, carries a layer of foamable plastics material. The decorative plastic layer may be deposited as a single layer but normally it is deposited in two or more layers, for instance by printing a decorative pattern and then covering this with a transparent wear resistant layer through which the pattern can be viewed. Generally the decorative plastics layer includes a surface that will serve as a wear layer.

The decorative plastic layer may be a continuous layer or may be a discontinuous layer, the areas of foamed layer that extends above being, at least partly, in the areas where there is no decorative plastic layer. It is generally preferred that the decorative plastic layer should comprise a continuous wear resistant layer and, beneath that, a continuous or discontinuous pattern of decoration.

A discontinuous layer of foamable polymeric material is then printed over the decorative plastic layer, leaving parts at least of the decorative plastic layer visible.

Figure 2:
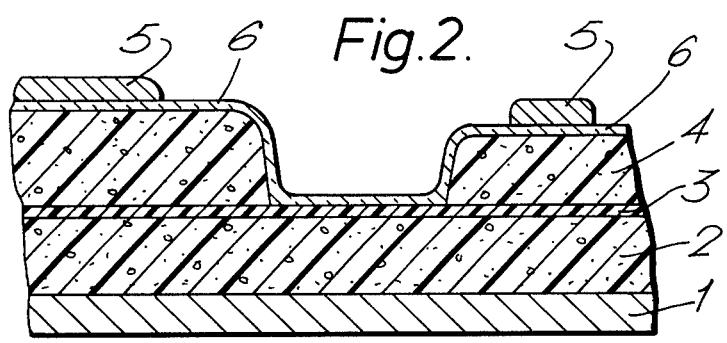
Figure 3:
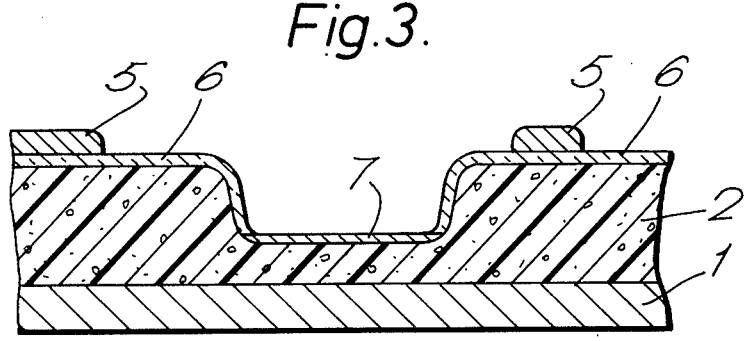

The present invention may be further understood by reference to the accompanying drawings, FIGS. 1 through 3, which are greatly enlarged cross-sectional views of products of this invention but where the various layers are not necessarily in proportion.

The accompanying drawings illustrate diagrammatically preferred products of the invention. The product shown in FIG. 1 comprises a fibrous substrate 1 carrying a surface layer 2 of foamed plastics material that in turn carries an overall decorative coating of solid plastics material 3. Over this there is foamed plastics material 4. If desired layer 3 can be a discontinuous coating that is present only in the areas not covered by material 4. Decorative inks, not shown, are printed on this having been applied before foaming. Above this there is a discontinuous layer greater than 0.05 mm thick in the form of deposits 5 of unfoamed material and a clear continuous layer 6 at least 0.05 mm thick which is of an unfoamed composition. The deposits 5 give a profiling effect. The layer 6 may provide a matt finish but generally gives a gloss finish.

In the product of FIG. 2 the overall layer 6 is beneath the deposits 5 instead of above them. The deposits 5 again give a profiling effect. Preferably the layers 5 and 6 give different gloss effects, for instance the deposits 5 being glossy and the layer 6 giving a matt finish.

In one example the layer 3 may be provided by applying onto a layer 0.25 mm thick of foamable plastisol an overall coating of an ink containing gold coloured metallic particles. Foamable compositions to form the foamed product 4 are then printed on this and the non-foamed layers 5 and 6 are printed, and the product is then heated to cause foaming and to cure the product.

Whereas the presence of deposits 4 in the product of FIGS. 1 and 2 leads to differences in thickness similar differences have been obtained in the product of FIG. 3 by a chemical process. Thus a layer of foamable plastisol was spread over the substrate, printed with inks containing foaming inhibitor or activator and optionally also inert decorative inks (not shown), a protective layer was applied and the product foamed and cured. In the product shown the protective layer comprises three non-foamed layers 5, 6 and 7 printed on the foamable layer 2 before foaming. Layer 6 is printed on all the surface area except the recessed areas, while layer 5 is printed on parts only of the raised areas. Both layers 5 and 6 are greater than 0.05 mm thick. In the areas that are recessed (e.g. where foaming inhibitor inks have been printed) a layer 7 which is 0.01 and 0.04 mm thick of polyurethane lacquer has been applied. Alternatively layer 7 may cover the entire surface area with layer 6 applied over parts of it.

The deposits 5 give a profiling effect and the formulations for layers 5, 6 and 7 can be chosen such that at least two of them give differences in gloss as well. For instance layers 5 and 6 may be glossy while layer 7 gives a matt effect. If profiling effect is not desired then deposits 5 may be omitted, the protective layer then consisting solely of layers 6 and 7. If desired layer 6 may be a continuous layer with layer 7 applied over parts of it. Instead of being a thin layer of polyurethane lacquer layer 7 may, for instance, be more than 0.05 mm thick and may be of a vinyl composition.

The following are examples of methods of making products of the invention.

EXAMPLE 1

An asbestos felt is coated with a layer of polyvinyl chloride composition containing blowing agents which will expand the layer on fusion. This coated substrate is printed with several different inks by means of a rotary screen printing technique, one of the inks containing a blowing inhibitor of the expansion process. At the penultimate station of the rotary screen printing machines an allover application of a plastisol PVC wear layer 0.15 mm thick is applied. At the final printing station another plastisol PVC wear layer 0.15 mm thick is printed to coincide with parts only of those areas which have not been printed with ink containing inhibitor.

When the printed and wear layered material is heated to fusion and foam expansion temperature the resulting product is a textured, cushioned patterned material in which the profile is due both to the wear layer and the foamed layer.

EXAMPLE 2

An asbestos felt is coated with a layer of polyvinyl chloride composition containing blowing agents which will expand the layer on fusion. This coated substrate is printed with several different inks by means of a rotary screen printing technique, one of the inks containing a blowing inhibitor of the expansion process. At the penultimate station of the rotary screen printing machines an allower application of a plastisol PVC wear layer 0.15 mm thick, so formulated that on fusion it produces a glossy film, is applied. At the final printing station another plastisol PVC wear layer, so formulated that on fusion a dull film 0.075 mm thick results, is printed to coincide with those areas which have not been printed with colour containing inhibitor.

When the printed and wear layered material is heated to fusion and foam expansion temperature the resulting product is a textured, cushioned patterned material in which the sunken areas of the textured pattern are glossy and the raised areas are dull.

The substrate generally has a weight of 150 to 1,000, preferably 200 to 700 g/m² of fibres and binder, with the binder often being from 10 to 50% of the total weight. The substrate may have a coating of plastics material over it, but generally the total weight of substrate, including any such plastics coating, is less than 2,000 g/m² and the thickness is generally less than 1.2 mm. Normally the thickness is at least 0.3 mm, with 0.5 to 1 mm generally being preferred. Greater weights and thicknesses are preferred when the substrate is to be used for a floor covering than when it is to be used for a wall covering. The total amount of foamable plastisol is generally from 200 to 800 g/m², preferably 300 to 500 g/m² if the material is to be used as a floor covering, but may be from 50 to 300 g/m² if the material is to be used as a wall covering. If the material is to be used as a wall covering then it may be satisfactory for the protective layer to be a lacquer 0.01 to 0.04 mm thick in the valleys at least but for floor coverings it is preferred that the protective layer should be at least 0.05 mm thick over the entire surface area.

We claim:

1. A floor or wall covering comprising a foamed polymeric layer including raised areas separated by recessed areas and a protective layer over the upper surface of the covering and comprising a first non-foamed layer and a visible second non-foamed layer above the first layer and in which the second non-foamed layer is discontinuous and leaves part at least of the first non-foamed layer uncovered and has a gloss different from that of the first non-foamed layer, and in which the thickness of the first and second non-foamable layers together is not more than 0.1 mm more than the thickness of the thicker of the non-foamable layers, and the thickness of the raised areas of the foamed polymeric layer is more than 0.1 mm more than the thickness of the recessed areas.

2. A covering according to claim 1 in which the second non-foamed layer at least partially overlies the first layer.

3. A covering according to claim 2, in which the second layer is less than 0.1 mm thick.

4. A covering according to claim 1 in which the raised areas of the foamed layer are in register with the pattern of differences in gloss.

5. A covering according to claim 1 in which the second layer that is over the recessed areas is 0.01 to 0.04 mm thick.

6. A covering according to claim 1 in which the foamed polymeric layer is a layer obtained by printing differently foamable plastisols or different amounts of foamable plastisols or by selectively controlling foaming of areas of a foamable plastisol, and foaming the resultant layer.

7. A covering according to claim 1 in which the foamed layer is discontinuous and is over a visible decorative layer that serves as part of the protective layer or is visible through the protective layer.

8. A covering according to claim 1 including a decorative pattern printed between the foamed layer and the protective layer and in which at least one of the non-foamed layers of the protective layer is transparent and parts at least of the pattern are visible.

9. A covering according to claim 1 wherein the thickness of the non-foamed layers together is 0.05 to 0.1 mm more than the thickness of the thicker of the non-foamed layers.

10. A covering according to claim 9 wherein the thickness of the raised areas of the foamed layer is 0.1 to 0.3 mm more than the thickness of the recessed areas.

11. A covering according to claim 1 wherein the protective layer is formed by coating or printed.

* * * * *